United States Patent
Humphrey (10) Patent No.: US 7,588,389 B1
(45) Date of Patent: Sep. 15, 2009

(54) GREENSROLLER WITH VARIABLE VIBRATION AMPLITUDE

(76) Inventor: John L. Humphrey, 327 Willowpointe Dr., St. Charles, MO (US) 63304

( * ) Notice: Subject to any disclaimer, the term of this patent is extended or adjusted under 35 U.S.C. 154(b) by 0 days.

(21) Appl. No.: 11/612,878

(22) Filed: Dec. 19, 2006

(51) Int. Cl.
*E01C 19/38* (2006.01)

(52) U.S. Cl. ........................ 404/117; 404/131

(58) Field of Classification Search ............... 404/131, 404/117
See application file for complete search history.

(56) References Cited

U.S. PATENT DOCUMENTS

| | | | | |
|---|---|---|---|---|
| 2,731,781 A | * | 1/1956 | MacVicar | 56/249.5 |
| 2,770,938 A | * | 11/1956 | Kiernan | 56/2 |
| 3,225,669 A | * | 12/1965 | Green | 404/117 |
| 3,590,702 A | * | 7/1971 | Sechi | 404/117 |
| 3,598,029 A | * | 8/1971 | Paramythioti | 404/117 |
| 3,605,582 A | * | 9/1971 | Kaltenegger | 404/117 |
| 3,736,066 A | * | 5/1973 | Koontz | 404/117 |
| 3,814,533 A | * | 6/1974 | Buck | 404/133.1 |
| 4,105,356 A | * | 8/1978 | Loveless | 404/117 |
| 4,152,943 A | * | 5/1979 | Wall | 74/87 |
| 4,262,549 A | * | 4/1981 | Schwellenbach | 74/87 |
| 4,350,460 A | * | 9/1982 | Schmelzer et al. | 404/117 |
| 4,353,261 A | * | 10/1982 | Salani | 74/87 |
| 4,454,780 A | * | 6/1984 | Goehler et al. | 74/87 |
| 4,460,346 A | | 7/1984 | Behnke | |
| 4,515,027 A | | 5/1985 | Baier et al. | |
| 4,645,014 A | * | 2/1987 | Andersson et al. | 173/49 |
| 4,749,305 A | * | 6/1988 | Brown et al. | 404/117 |
| 4,830,534 A | | 5/1989 | Schmelzer et al. | |
| 4,993,869 A | * | 2/1991 | Ulmer et al. | 404/117 |
| 5,261,213 A | | 11/1993 | Humphrey | 56/2 |
| 5,860,552 A | * | 1/1999 | Culhane et al. | 220/212 |
| 6,224,293 B1 | * | 5/2001 | Smith | 404/117 |
| 6,467,245 B1 | * | 10/2002 | Humphrey | 56/249.5 |
| 6,585,450 B2 | * | 7/2003 | Meyers et al. | 404/117 |
| 6,637,280 B2 | * | 10/2003 | Potts | 74/87 |
| 6,659,191 B1 | * | 12/2003 | Humphrey | 172/40 |
| 6,725,736 B1 | * | 4/2004 | Sturesson | 74/87 |
| 6,837,648 B1 | | 1/2005 | Wadensten | |
| 7,066,681 B2 | * | 6/2006 | Paske | 404/117 |
| 2003/0082001 A1 | * | 5/2003 | Potts | 404/117 |
| 2003/0082003 A1 | * | 5/2003 | Potts | 404/117 |
| 2006/0147265 A1 | * | 7/2006 | Fluent et al. | 404/117 |

* cited by examiner

*Primary Examiner*—Gary S Hartmann
(74) *Attorney, Agent, or Firm*—Grace J. Fishel (57) ABSTRACT

A vibratory roller unit with a framework having a rotating shaft and a drum. The shaft has a fixed inboard eccentric weight and an outboard eccentric weight rotatable with respect to the fixed inboard eccentric weight for varying the amplitude of the vibrations on the drum. A powered lawn mower of the type adapted for mowing greens on golf courses and having a powered vertically adjustable reel cutting unit is converted into a greensroller when a vibratory roller unit is substituted for each reel cutting unit.

20 Claims, 5 Drawing Sheets

GREENSROLLER WITH VARIABLE VIBRATION AMPLITUDE

BACKGROUND OF THE INVENTION

1. Field of the Invention

The present invention relates to a vibratory roller unit having a rotating shaft in a drum with a fixed inboard eccentric weight and an outboard eccentric weight rotatable with respect to the fixed inboard eccentric weight for varying the amplitude of the vibrations on the drum. Vibratory roller units are used to convert a powered lawn mower into a greensroller.

2. Brief Description of the Prior Art

Vibratory roller units of the kind described in U.S. Pat. No. 5,261,213 to Humphrey are used to convert a powered lawn mower of the type particularly adapted for mowing greens on golf courses into a greensroller by removing the reel cutting units and replacing them with vibratory roller units. The vibratory roller units are powered by the hydraulic motors which are used to power the reel cutting units.

With an unbalanced shaft, it is known that the amplitude of the vibrations is dependent upon the rotation rate of the eccentric weight but the speed of the hydraulic motors attached to the vibratory roller units are affected by the condition of the lawn mower, e.g., new or old, as the motors are powered by the lawn mower's hydraulic system. Thus, the same vibratory roller units on one lawn mower may apply different vibratory force on another mower.

In addition, the speed of the hydraulic motors may vary at the same hydraulic pressure from motor to motor and even with the same motor over time. Hence with a triplex mower, for example, with three different reel cutting units each powered by a hydraulic motor, the vibratory roller units may apply different vibratory forces because of the variation in the speed of the hydraulic motors. In some instances, it may be desirable to equalize the force applied by the different vibratory roller units in the greensroller.

And there are other variables. For example, it may be desirable to vary the vibratory force applied to the greens to achieve consistent ball roll distance between greens, some greens being firmer before rolling than others. Also more vibratory energy may be desirable during grow-in of new greens to settle the sand and/or soil based green or to disperse a sand topdressing when the grass is damp. More or less energy may also be desirable depending on the height of the cut and variety of the turf. Heretofore, variation in the vibratory force applied by a vibratory roller unit attached to a given lawn mower could be achieved by changing the ground speed of the mower thereby applying more or less vibratory force or by changing engine speed (RPMs) which affects the hydraulic pressure in the hydraulic system such that the hydraulic motors run faster or slower. These variations, however, are dependent on the skill of the operator and do not equalize the force applied by different motors.

Thus there is a need for a mechanism for varying the amplitude of the vibrations in a vibratory roller unit for use in a greensroller other than by varying the ground speed of the mower or by changing engine speed, preferably in a reproducible stepped manner that is less dependent on the operator. The present invention addresses this need.

BRIEF SUMMARY OF THE INVENTION

In view of the above, it is an object of the present invention to provide a vibratory roller unit for a greensroller with variable vibration amplitude. It is also an object to provide additional control over the vibratory force applied to the green. It is another object to provide a greenskeeper with better control over the way in which the greens are rolled. Other objects and features of the invention will be in part apparent and in part pointed out hereinafter.

In accordance with the present invention, a vibratory roller unit with variable vibration amplitude is provided for use in converting a riding lawn mower of the kind used to mow golf greens into a greensroller. More particularly, the vibratory roller unit is adapted for use on a lawn mower of a type having a power means for raising and lowering a lift bar from which a reel cutting unit has been removed. The reel cutting unit is driven by the power means and is of a type wherein a transversely extending cutting reel and bed knife assembly is carried by a frame and the frame has means for attaching the frame to the lift bar.

The vibratory roller unit has a framework adapted for attachment to the lift bar and a transversely extending drum rotatably mounted in the framework. The drum is lifted in and out of contact with the ground by the lift bar and when in contact follows the ground. A shaft is rotatably mounted in the drum and is driven by the power means. Inboard and outboard eccentric weights are mounted on the shaft. The inboard eccentric weights are fixed and the outboard eccentric weights are rotatable about the shaft with respect to the fixed inboard eccentric weights. In use, the inboard and outboard eccentric weights apply a centrifugal force which is transmitted to the drum and applied to the ground under the drum as the drum rolls across the ground. By changing the position of the outboard eccentric weights with respect to the inboard eccentric weights, the centrifugal force may be varied in amplitude between a maximum and minimum.

In one embodiment, the inboard and outboard eccentric weights are cylindrical in shape with off-center throughbores for the shaft. The outboard eccentric weights include a spring biased detent and the shaft a plurality of recesses such that the position of the outboard eccentric weights with respect to the inboard eccentric weights may be dialed in with the spring biased detent resiliently biased between engaged and disengaged positions in a stepped manner.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which.

DETAILED DESCRIPTION OF THE INVENTION

Figure 1:
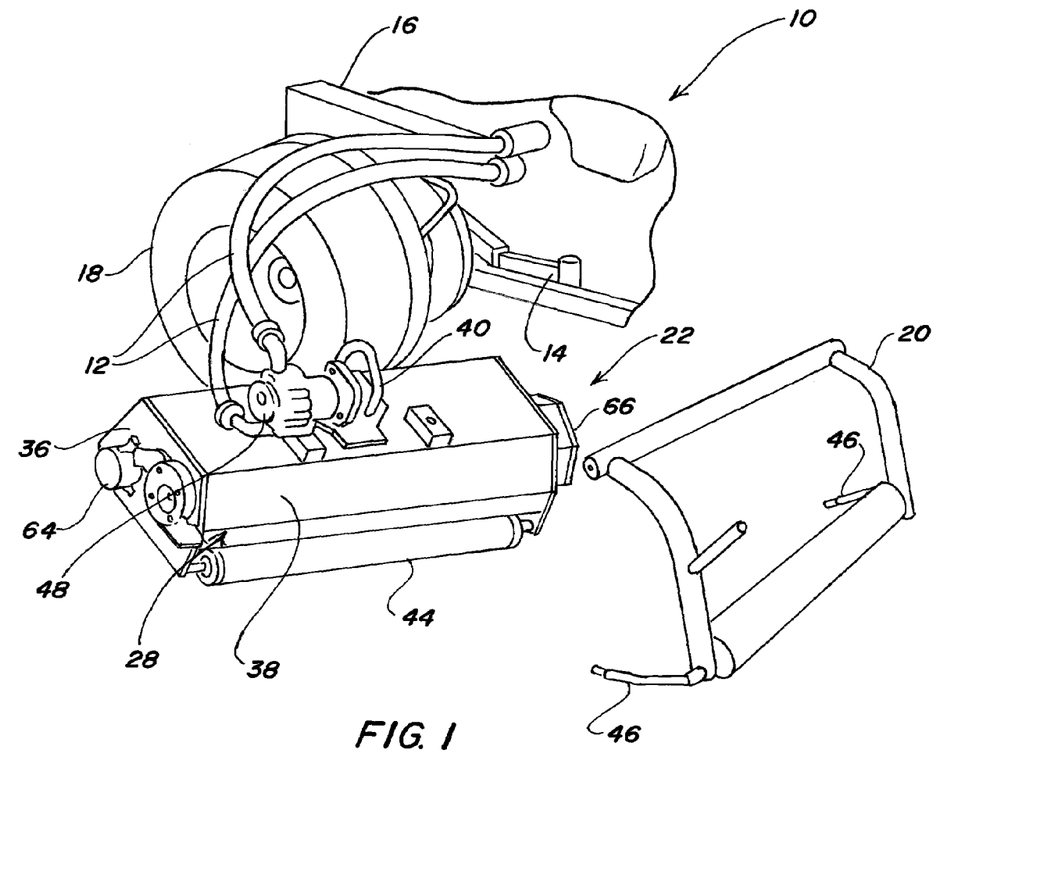
FIG. 1 is a fragmentary perspective view of a lawn mower from which a reel cutting unit has been removed and a vibratory roller unit in accordance with the present invention is in the process of being attached.

Referring to the drawings more particularly by reference character and beginning with FIG. 1, reference numeral 10 refers to a greensroller in accordance with the present invention. Greensroller 10 comprises a lawn mower of a type having a power means such as a hydraulic system 12 for raising and lowering a lift bar 14 from which the reel cutting units have been removed. Greensroller 10 includes a frame 16 and wheels 18 for movably supporting frame 16. Depending of the type of lawn mower, the reel cutting units may be attached to lift bar 14 with a hook and mounted in a pull frame 20 as shown in FIG. 1. In others, the reel cutting units are attached to lift bar 14 with a swivel or the like.

Figure 2:
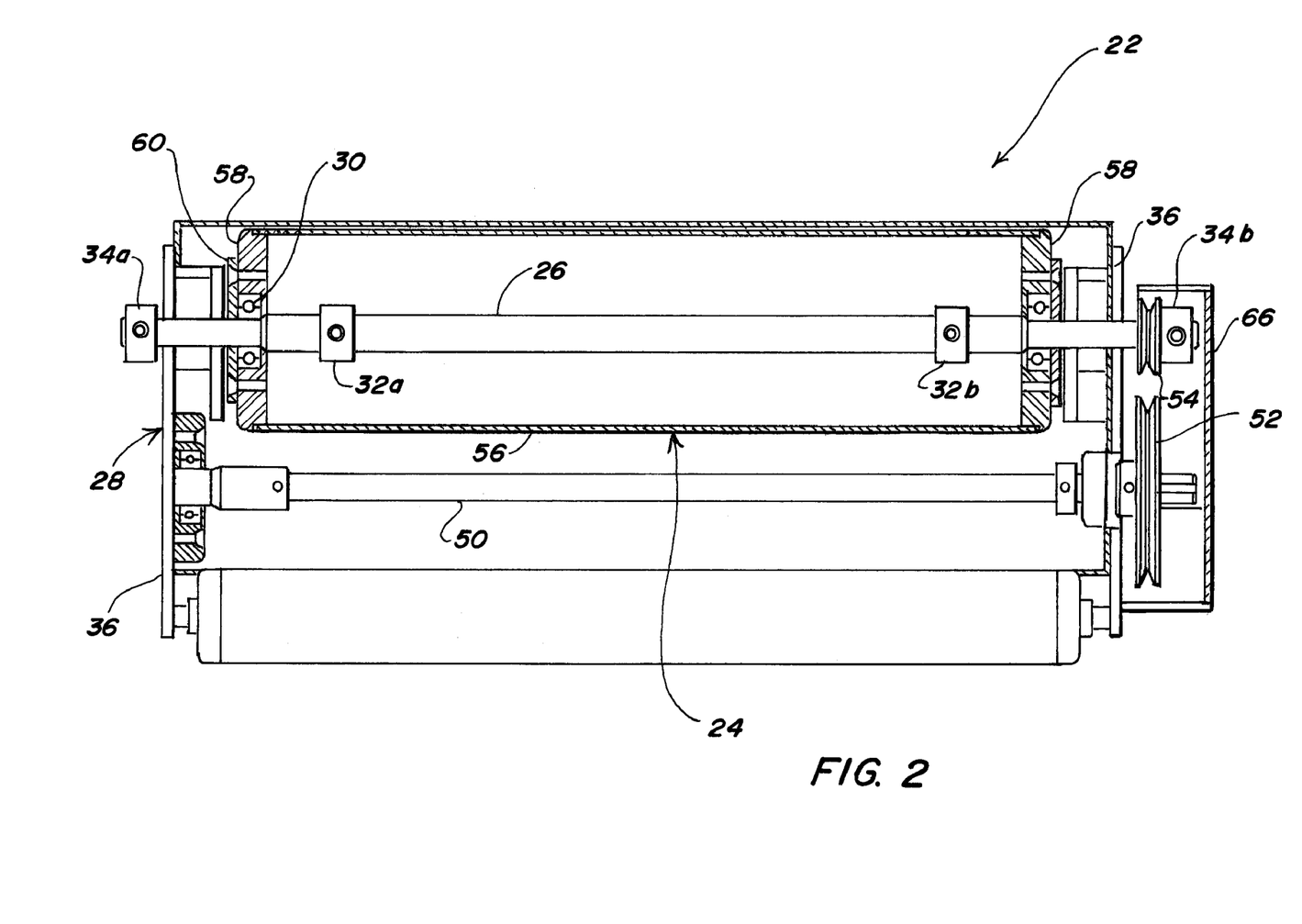
FIG. 2 is a plan view the vibratory roller unit with the C-shaped housing and metal supporting structure removed.

A vibratory roller unit 22 in accordance with the present invention is shown in FIG. 1 detached from lift bar 14 and pull frame 20. As seen in FIG. 2, vibratory roller unit 22 includes in major part a transversely extending drum 24, a shaft 26 and a framework 28. Shaft 26 is rotatably mounted in drum 24 on bearings 30 and drum 24 is rotatably mounted in framework 28. An inboard fixed eccentric 32, illustrated as a pair of eccentrics 32a, 32b, is mounted on shaft 26 and an outboard eccentric 34, illustrated as a pair of eccentrics 34a, 34b, is also mounted on shaft 26. Vibratory roller unit 22 is designed such that it has the same or nearly the same weight as the reel cutting unit that it replaces so that it does not strain the hydraulics which are provided for lifting the reel cutting unit.

Figure 3:
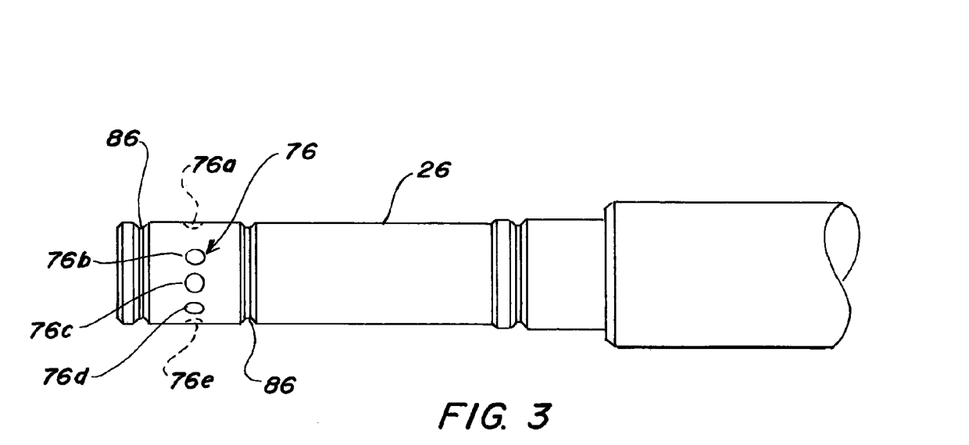
FIG. 3 is an enlarged detail in side elevation of the left end of the vibratory shaft as viewed in FIG. 2.

Framework 28 as shown in FIGS. 1 and 2, comprises a pair of spaced apart, parallel side plates 36 connected by a generally C-shaped housing 38 (FIG. 1) with an open bottom. C-shaped housing 38 is supported by a metal structure which is not shown in the drawings. A hook 40 (serving as a means for lifting vibratory roller unit 22 with lift bar 14) is attached to a top of housing 40. Alternatively a swivel as shown in FIG. 3 of U.S. Pat. No. 6,467,245 to Humphrey may replace hook 40 depending on the nature of the riding lawn mower (e.g., Jacobsen versus Toro). A front roller 44 may be provided along a bottom forward end of side plates 36. A rear roller (not shown) may also be attached to side plates 36 to the rear of drum 24 if desired. Pull frame 20 has a pair of tow arms 46 for attachment to vibratory roller unit 22.

A hydraulic motor 48 is attached to one of side plates 36. In some multiple reel lawn mowers, the reel cutting units are not all driven from the same side so that some of the motor mounts are on the left while others are on the right. Hydraulic motor 48 is attached to a jack shaft 50 that is rotatably journaled in side plates 36 and connected to a drive pulley 52. Drive pulley 52 is attached to a driven pulley 54 with a belt (not shown). Driven pulley 54 is sized with respect to drive pulley 52 such that driven pulley 54 spins at increased speed. It will be understood that hydraulic motor 48 may be mounted on the same side as drive pulley 52 but the jack shaft arrangement discussed above is preferred for better weight balance of vibratory roller unit 22.

Figure 9:
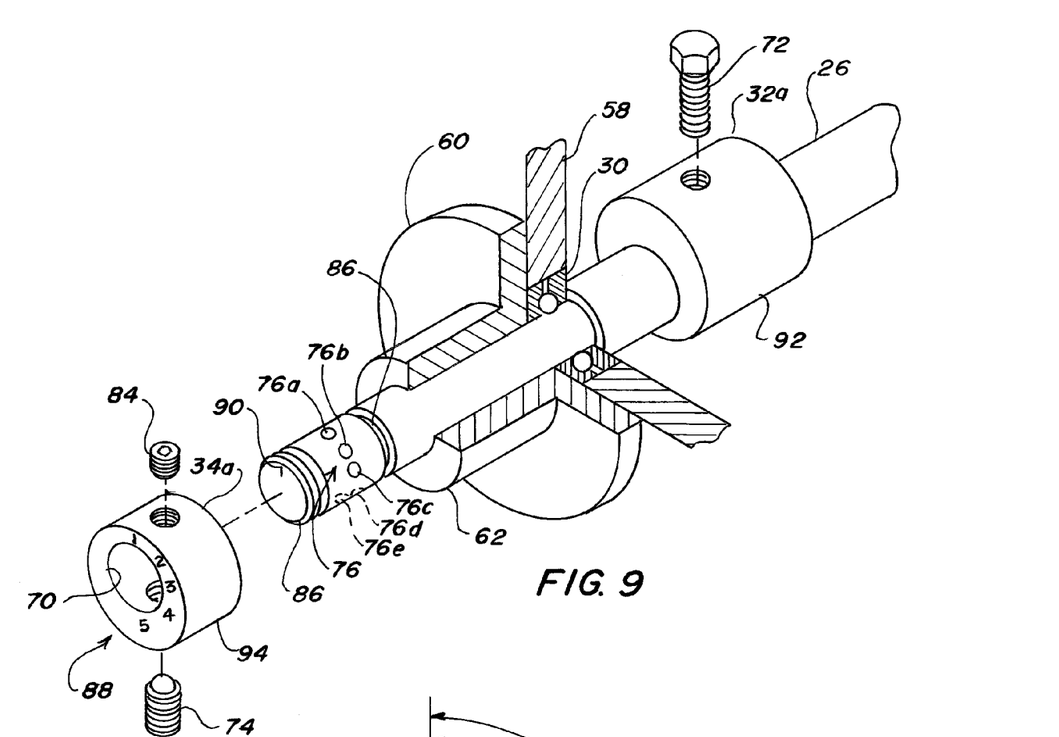
FIG. 9 is a perspective view showing one of the inboard eccentric weights fixed to the shaft and one of the outboard eccentric weights removed from the shaft; and, FIG. 10 is an end view of the shaft with a plurality of recesses into which spring biased detents of the outboard eccentric weights may be resiliently biased between engaged and disengaged positions.

Drum 24 is a hollow cylinder 56 capped with end plates 58. End plates 58 have a central aperture into which bearings 30 are fitted and shaft 26 is journaled. A circular plate 60 with an attached collar 62 (FIG. 9) is attached to each of end plates 58. The back of circular plate 60 holds bearing 30 in place and collar 62 serves as a drum axle journaled in framework 28. As shown, inboard eccentric weights 32a, 32b are mounted on shaft 26 inside of drum 24 near bearings 30 to minimize possible deflection of shaft 26. One end of shaft 26 extends beyond drum 24 for connection to driven pulley 54 and to outboard eccentric weights 34b. The opposite end of shaft 26 also extends beyond drum 24 for connection to outboard eccentric weight 34a. An end cap 64 (FIG. 1) may be provided over outboard eccentric weight 34a and a belt guard housing 66 (FIGS. 1 and 2) may be provided over drive and driven pulleys 52, 54, respectively, and outboard eccentric weight 34b.

In the embodiment shown in the drawings, inboard eccentric weights 32a, 32b are attached to shaft 26 such that they rotate with the shaft. Outboard eccentric weights 34a, 34b are rotatable about shaft 26 with respect to inboard eccentric weights 32a, 32b and then fixed such that they also rotate with shaft 26. When shaft 26 rotates, inboard eccentric weights 32a, 32b and outboard eccentric weights 34a, 34b apply a combined centrifugal force which is transmitted to drum 24 through bearings 30. At a given rate of rotation, the amplitude of the centrifugal force varies between a maximum and a minimum depending upon the rotatable position of outboard eccentric weights 34a, 34b with respect to inboard eccentric weights 32a, 32b. As illustrated, outboard eccentric weights 34a, 34b are smaller than inboard eccentric weights 32a, 32b such that by positioning outboard eccentric weights 34a, 34b the centrifugal force imparted by inboard eccentric weights 32a, 32b is either enhanced or reduced but never canceled.

Figure 4:
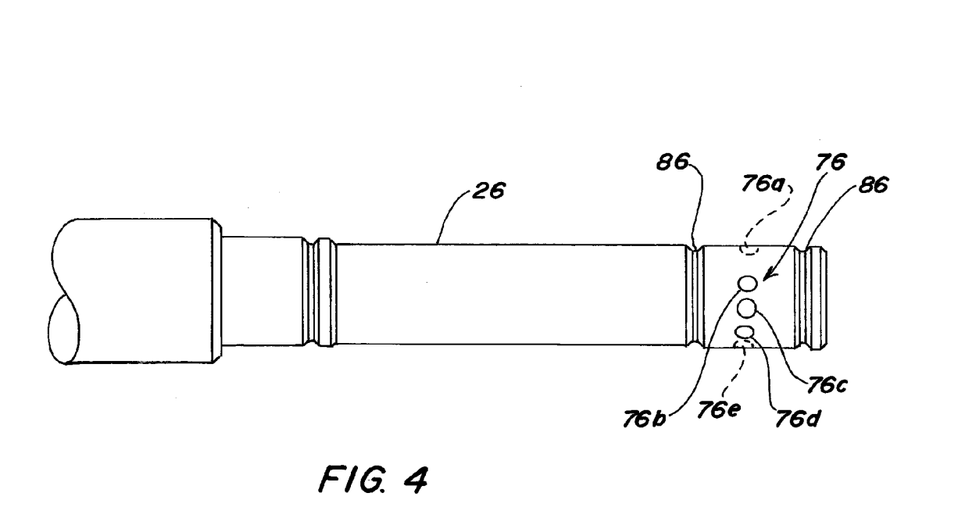
FIG. 4 is an enlarged detail in side elevation of the right end of the vibratory shaft as viewed in FIG. 2.

As shown in FIGS. 5-9, inboard eccentric weights 32a, 32b and outboard eccentric weights 34a, 34b have a throughbore 68, 70, respectively for shaft 26. Inboard eccentric weights 32a, 32b may be fixed on shaft 26 with a mounting bolt 72 or the like. Outboard eccentric weights 34a, 34b may be provisioned with a radially extending spring biased detent 74 such as a spring plunger (FIG. 9) or the like for receipt in recesses 76 (FIGS. 3-4 and 9) provided in shaft 26. When spring biased detent 74 is resiliently biased in one of recesses 76, outboard eccentrics 34a, 34b rotate with shaft 26. As shown in FIGS. 3-4, recesses 76 are arranged in a semi-circle with the first 76a and last recess 76e being diametrically opposed. While this arrangement is preferred, it is not mandatory. For example, recesses 76 may extend around the circumference of shaft 26 or for less than half the circumference. The number of recesses 76 may also vary. Preferably, however, there are at least three, one resulting in maximum amplitude (e.g., 76a), one at minimum amplitude (76e) and one between. More choices may also be provided, for example as shown in FIGS. 3, 4 and 9-10, with three recesses (76b, 76c, and 76d) between the extremes if desired.

Figure 5:
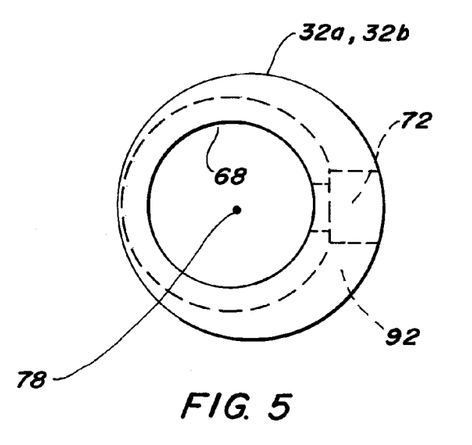
FIG. 5 is an enlarged end view of an inboard eccentric weight.
Figure 6:
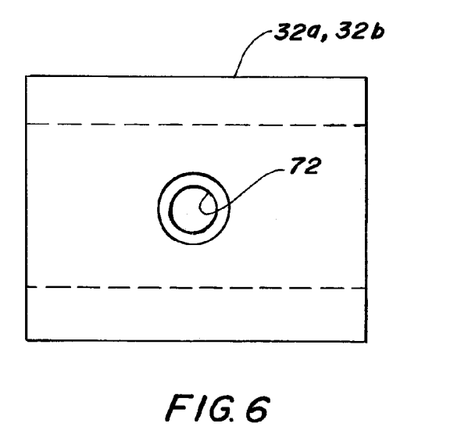
FIG. 6 is an enlarged side elevation of the inboard eccentric weight.
Figure 7:
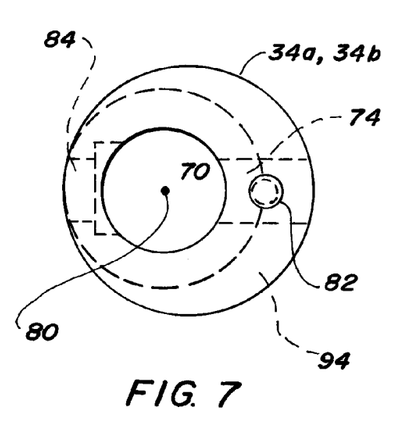
FIG. 7 is an enlarged end view of an outboard eccentric weight.
Figure 8:
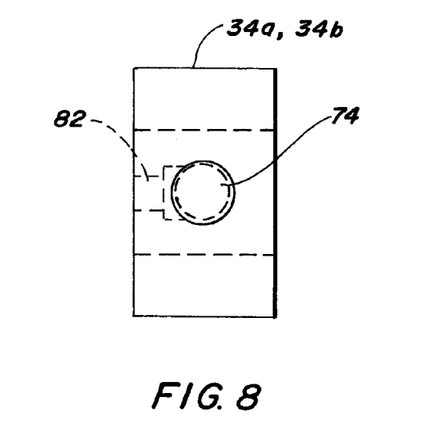
FIG. 8 is an enlarged side elevation of the outboard eccentric weight.

More particularly as shown in FIGS. 5-8, inboard eccentric weights 32a, 32b and outboard eccentric weights 34a, 34b are cylindrical and throughbores 68, 70, respectively, are positioned off longitudinal centerlines 78, 80, respectively. A set screw 82 or the like may be provided for locking spring biased detent 74 in position such that it can be resiliently-biased between engaged and disengaged positions with respect to detent recesses 76 by applying a rotary force on outboard eccentrics 34a, 34b by finger pressure or the like. A radially extending set screw 84 may be provided in outboard eccentrics 34a, 34b as a backup to spring biased detents 74 to ensure that outboard eccentric weights 34a, 34b are locked on shaft 26 after they have been rotatably positioned with respect to inboard eccentric weights 32a, 32b. Longitudinal movement of outboard eccentric weights 34a, 34b on shaft 26 during rotation about the shaft is resisted by E-rings (not shown) or the like which are received in a pair of flanking grooves 86. When inboard eccentric weights 32a, 32b and outboard eccentric weights 34a, 34b are cylindrical with off-center throughbores 68, 70, vibratory roller unit 22 operates more smoothly and is less susceptible to erratic vibrations than with bolt-on bar weights. This is because more of the weight in cylindrical eccentric weights 32a, 32b and 34a, 34b is within an eccentric weight circle (FIGS. 5 and 7).

Figure 10:
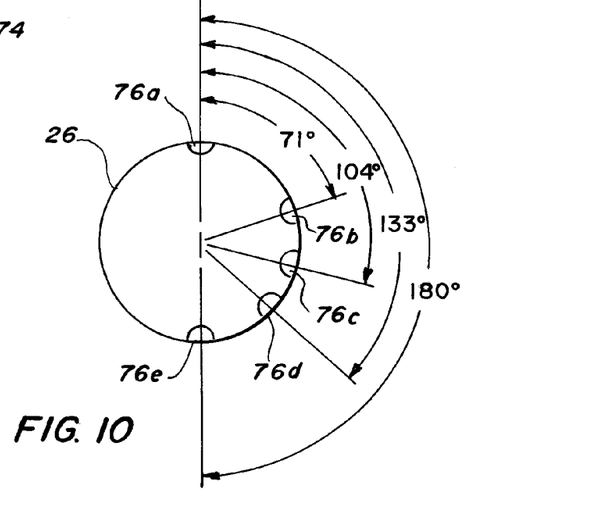

For the purpose of easily determining the alignment of outboard eccentric weights 34a, 34b with respect to inboard eccentric weights 32a, 32b indicia 88 (FIG. 9) may be provided on an outboard side of the weight for use in connection with an index mark 90 on shaft 26. The spacing between indicia 88 is indexed to the spacing between detent recesses 76 in shaft 26 such that, for example, alignment of "5" on outboard eccentric weights 34a, 34b with index mark 90 on shaft 26 indicates that eccentric lobes 92 (inboard eccentric weights 32), 94 (outboard eccentric weights 34) are aligned on the same side of shaft 26 such that the centrifugal force amplitude is at a maximum. An alignment of "1" with index mark 90 indicates that lobes 92, 94 are in opposition and that minimum centrifugal force amplitude will be applied to drum 24. Intermediate positions "2", "3" and "4" may be set such that the amplitude is adjusted, for example by 20% between settings as shown in FIG. 10 where recesses 76 are at 0, 71, 104, 133 and 180 degrees for outboard eccentric weights 34a, 34b of a particular diameter and weight.

Variations on what has been described may occur to those skilled in the art. For example, spaced recesses 76 are preferred for varying amplitude force in a reproducible stepped manner, however indicia 88 and index mark 90 may be manually aligned and outboard eccentric weights 34a, 34b locked to shaft 26 with set screw 84 alone. Other examples include the physical placement of outboard eccentric weights 34a, 34b which are illustrated as outside of drum 24 but which may be inside drum 24 in other embodiments. Still other examples include the way in which outboard eccentric weights 34a, 34b are stepped about shaft 26 with respect to inboard eccentric weights 32a, 32b. For example, throughbore 70 may include a keyway and the end of shaft 26 provided with a plurality of integral lands forming spaced apart keys, etc.

In use, a lawn mower may be converted into a greensroller 10 as follows: Hydraulic motor 48 is disconnected from each reel cutting unit and the reel cutting units removed from lift bar 14 and disconnected from pull frame 20 if one is provided and replaced with vibratory roller units 22. Hydraulic motor 48 is then attached to side plate 36 and jack shaft 50.

In the embodiment shown in the drawings, end cap 64 is removed from side plate 36 to expose outboard eccentric weight 34a. Set screw 84, if present, is loosened such that outboard eccentric weight 34a can be rotated on shaft 26 to adjust the amplitude of the centrifugal force applied to drum 24. If less force is wanted, outboard eccentric weight 34a is rotated (i.e., dialed in) such that index mark 90 points to a lower number. Whereas if more force is wanted, outboard eccentric weight 34a is rotated such that index mark 90 points to a higher number bringing eccentric lobes 92 and 94 closed into registry. During this operation, a tee handle key wrench through belt guard housing 66 may be applied to set screw 84 on outboard eccentric weight 34b to provide a brake action on shaft 26. This makes rotation of outboard eccentric weight 34a on shaft 26 easier by stopping the shaft from rotation.

After first outboard eccentric weight 34a is set, the same setting may be made on outboard eccentric weight 34b. Set screw 84 is loosened first under belt guard housing 66. Outboard eccentric weight 34b is then dialed by rotating shaft 26 from other outboard eccentric weight 34a. Proper alignment of index mark 90 with indicia 88 on outboard eccentric weight 34b may be confirmed through an inspection slot or window provided in belt guard housing 66. Set screw 84 is then tightened and end cap 64 replaced over outboard eccentric weight 34a.

For a skilled operator, the present invention provides an additional means for controlling the vibratory force applied to a golf green. It also provides a greenskeeper with a way to minimize operator variables if he likes. To do this, the operator may be told to roll the green at a given ground speed and RPM and at a given dial setting on outboard eccentric weights 34a, 34b. With the machine variables of ground speed and RPMs thus removed from operator control, the greenskeeper may apply his judgment to proper dial settings for outboard eccentric weights 34a, 34b depending on the height of the cut, moisture, variety of turf, fertilizer program, thatch levels, soil types, 100% sand greens, etc. that he instructs the operator to dial in. With a stimpmeter to prove ball roll distance, the greenskeeper may fine tune his dial-in instructions such that he achieves the golf green conditions that he wants on a more consistent basis.

Another application of the present invention is for target green rolling. Rolling the green increases ball roll speed but rolling too frequently causes turf wear. Target green rolling addresses this problem. When a hole is moved on a green, with target green rolling only the green around the cup is rolled. In this manner, green rolling in a target manner can be done six times weekly, if the holes are changed six times weekly, which is the equivalent of rolling two or three times since the entire green is not being rolled every time. With the machine variables (ground speed, RPMs and dial position for eccentric weights 34a, 34b) under the control of the greenskeeper, fast target rolling of the greens may be feasible, for example even between rounds of golf.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A vibratory roller unit adapted for use on a lawn mower of a type having a power means for raising and lowering a lift bar;

said vibratory roller unit comprising a framework adapted for attachment to the lift bar, a transversely extending drum rotatably mounted in the framework, said drum liftable in and out of contact with the ground by the lift bar and when in contact following the ground and a shaft driven by the power means and rotatably mounted within the framework, said shaft having a fixed inboard eccentric weight and an outboard eccentric weight, said outboard eccentric weight rotatable about the shaft with respect to the fixed inboard eccentric weight, said inboard and outboard eccentric weights being cylindrical with an off longitudinal centerline throughbore for the shaft, whereby the inboard and outboard eccentric weights are capable of applying a centrifugal force which is transmitted to the drum and applied to the ground under the drum as the drum rolls across the ground, said centrifugal force varying in amplitude between a maximum and minimum depending upon the rotatable position of the outboard eccentric weight with respect to the fixed inboard eccentric weight.

2. The vibratory roller unit of claim 1 wherein the shaft is within the drum.

3. The vibratory roller unit of claim 2 wherein the inboard eccentric weight is inside the drum and the outboard eccentric weight is outside the drum.

4. The vibratory roller unit of claim 3 wherein the outboard eccentric weight is adjustable with respect to the inboard eccentric weight in a stepped manner between a maximum and the minimum amplitude of centrifugal force.

5. A vibratory roller unit adapted for use on a lawn mower of a type having a power means for raising and lowering a lift bar;

said vibratory roller unit comprising a framework adapted for attachment to the lift bar, a transversely extending drum rotatably mounted in the framework, said drum liftable in and out of contact with the ground by the lift bar and when in contact following the ground and a shaft driven by the power means and rotatably mounted on shaft bearings inside the drum, said shaft having a fixed inboard eccentric weight inside the drum and an outboard eccentric weight outside the drum and rotatable about the shaft with respect to the fixed inboard eccentric weight, said outboard eccentric weight having a throughbore for the shaft, said shaft having a plurality of detent recesses that encircle the shaft, said outboard eccentric weight having a spring biased detent in the throughbore for resiliently-biasing between engaged and disengaged positions with respect to the detent recesses in the shaft, said outboard eccentric weight rotatable with the shaft when the spring biased detent is engaged with one of the detent recesses in the shaft, whereby the inboard and outboard eccentric weights are capable of applying a centrifugal force which is transmitted to the drum through the shaft bearings and applied to the ground under the drum as the drum rolls across the ground, said centrifugal force varying in amplitude between a maximum and minimum depending upon the rotatable position of the outboard eccentric weight with respect to the fixed inboard eccentric weight.

6. The vibratory roller unit of claim 5 wherein said inboard eccentric weight comprises a pair of weights, said weights mounted on the shaft near the shaft bearings.

7. The vibratory roller unit of claim 6 wherein the outboard eccentric weight comprises a pair of weights, said weights mounted at opposite ends of the shaft.

8. The vibratory roller unit of claim 7 wherein the inboard eccentric weights and the outboard eccentric weights are cylinders with a longitudinal centerline with a throughbore off centerline for the shaft, said shaft having at least three detent recesses, two of which are diametrically opposed on said shaft.

9. The vibratory roller unit of claim 8 wherein the shaft has an index mark on each end and the outboard eccentric weights have indicia which are indexed to the spacing between the detent recesses on the shaft wherein alignment of one of the indicia with the index mark indicates the position of outboard eccentric weights with respect to inboard eccentric weights.

10. The vibratory roller unit of claim 9 with means for resisting longitudinal movement of the outboard eccentric weights during rotation about the shaft with respect to the inboard eccentric weights.

11. A greensroller comprising:
a lawn mower of a type having a hydraulic system for raising and lowering a lift bar; and,
a vibratory roller unit comprising a framework adapted for attachment to the lift bar, a transversely extending drum rotatably mounted in the framework, said drum liftable in and out of contact with the ground by the lift bar and when in contact following the ground and a shaft driven by the power means and rotatably mounted within the framework, said shaft having a fixed inboard eccentric weight and an outboard eccentric weight, said outboard eccentric weight rotatable about the shaft with respect to the fixed inboard eccentric weight, said inboard and outboard eccentric weights being cylindrical with an off longitudinal centerline throughbore for the shaft, whereby the inboard and outboard eccentric weights are capable of applying a centrifugal force which is transmitted to the drum and applied to the ground under the drum as the drum rolls across the ground, said centrifugal force varying in amplitude between a maximum and minimum depending upon the rotatable position of the outboard eccentric weight with respect to the fixed inboard eccentric weight.

12. The greensroller of claim 11 wherein the shaft in the vibratory roller unit is within the drum.

13. The greensroller of claim 12 wherein the inboard eccentric weight in the vibratory roller unit is inside the drum and the outboard eccentric weight is outside the drum.

14. The greensroller of claim 13 wherein the outboard eccentric weight is adjustable with respect to the inboard eccentric weight in a stepped manner between a maximum and the minimum amplitude of centrifugal force.

15. A greensroller comprising:
a lawn mower of a type having a hydraulic system for raising and lowering a lift bar; and,
a vibratory roller unit adapted for use on a lawn mower of a type having a power means for raising and lowering a lift bar;
said vibratory roller unit comprising a framework adapted for attachment to the lift bar, a transversely extending drum rotatably mounted in the framework, said drum liftable in and out of contact with the ground by the lift bar and when in contact following the ground and a shaft driven by the power means and rotatably mounted on shaft bearings inside the drum, said shaft having a fixed inboard eccentric weight inside the drum and an outboard eccentric weight outside the drum and rotatable about the shaft with respect to the fixed inboard eccentric weight, said outboard eccentric weight having a throughbore for the shaft, said shaft having a plurality of detent recesses that encircle the shaft, said outboard eccentric weight having a spring biased detent in the throughbore for resiliently-biasing between engaged and disengaged positions with respect to the detent recesses in the shaft, said outboard eccentric weight rotatable with the shaft when the spring biased detent is engaged with one of the detent recesses in the shaft, whereby the inboard and outboard eccentric weights are capable of applying a centrifugal force which is transmitted to the drum through the shaft bearings and applied to the ground under the drum as the drum rolls across the ground, said centrifugal force varying in amplitude between a maximum and minimum depending upon the rotatable position of the outboard eccentric weight with respect to the fixed inboard eccentric weight.

16. The greensroller of claim 15 wherein said inboard eccentric weight in the vibratory roller unit comprises a pair of weights, said weights mounted on the shaft near the shaft bearings.

17. The greensroller of claim 16 wherein said outboard eccentric weight comprises a pair of weights, said weights mounted at opposite ends of the shaft.

18. The greensroller of claim 17 wherein the inboard eccentric weights and the outboard eccentric weights are cylinders with a longitudinal centerline with a throughbore off centerline for the shaft,
  said shaft having at least three detent recesses, two of which are diametrically opposed on said shaft.

19. The greensroller of claim 18 wherein the shaft has an index mark on each end and the outboard eccentric weights have indicia which are indexed to the spacing between the detent recesses on the shaft wherein alignment of one of the indicia with the index mark indicates the position of outboard eccentric weights with respect to inboard eccentric weights.

20. The greensroller of claim 19 with means for resisting longitudinal movement of the outboard eccentric weights during rotation about the shaft with respect to the inboard eccentric weights.

* * * * *